125,122

UNITED STATES PATENT OFFICE.

GEORGE DAVEY, OF LONDON, ENGLAND.

IMPROVEMENT IN THE MANUFACTURE OF IMITATION MARBLES.

Specification forming part of Letters Patent No. 125,122, dated April 2, 1872.

Specification describing certain "improvements in the manufacture of artificial or Marezzo marble, and in coloring, ornamenting, and inlaying cements," invented by GEORGE DAVEY, of New Cavendish street, London, England.

Hitherto, most of the processes for making artificial marble have failed, either because the articles produced were bad imitations of the natural material, or because the processes were too complicated, requiring expensive machinery, costly chemicals, and generally the articles produced had to be pressed by machinery and baked by fire. By my invention artificial marble is produced which so closely resembles nature as to defy detection, and in a rapid manner, without the use of any expensive chemicals, or machinery, or fire. And the material I manufacture by my process will stand exposure to any ordinary degree of heat and any ordinary atmospheric temperature, without injury or deterioration; and I am enabled to manufacture articles which are so thin as to be capable of being used for veneering, and others so solid as to serve as columns for the porticos of buildings; and instead of taking weeks, as some processes have done, I can produce artificial marble fit for commercial purposes in about thirty hours at the latest. My invention also enables me to produce artificial marble at a very economical rate. My invention relates, first, to the manufacture of slabs or variously-shaped pieces of marble in imitation of slabs of veined or other marbles of various kinds and sizes, by placing a piece or several pieces of plate glass together so as to form a surface not less than the required size of the slab of marble required, perfectly level and horizontally upon a frame or frames variously constructed, and supported by suitable standards or other firm and level supports, and then for imitating veined marble, I take fibers of silk or other suitable fibers, longer than the length or width of the slab, and dip them in suitable colors mixed with liquid, as may be necessary to imitate the veins or figures similar to the veins of the marble to be imitated, and then laying the fibers upon the glass so as to imitate in an artistic manner the required veins and figures. Should it be desired to imitate marbles in which other figures than veins appear, I then mix suitable colors and portions of the finest cement, preferring that known as Keene's patent marble cement, with liquid, and place such portions of the cement of the required size and form on the glass among the fibers representing the veined portions; or sometimes I discard the fibers altogether, and use only the colored portions or figures, as above described, if it be required to imitate marbles in which veins do not appear, and by amalgamating and mingling them in the manner dictated by nature, I produce the effect desired. In either case, I then take the finest white cement, above mentioned, mixed with liquid and colors, also, if required, in tints or otherwise, and spread the mixture over the surface of the glass, and over and upon the fibers and cement adhering thereto, so as to cover the same to the thickness of about an eighth of an inch or more. The fibers, used as before described, are then lifted up and drawn carefully up from the glass through the yielding body of the cement, and are then removed and the colored cement so spread upon the glass is then smoothly pressed down by a trowel or other suitable implement, so as to form an even layer upon the glass. I then take a piece of canvas or other suitable material and lay it smoothly upon the back of the cement. A layer of coarser cement but of similar kind is then to be spread upon the cemented mass until it attains the desired thickness, so as to give the slab sufficient strength according to its size. The whole is then allowed to set upon the surface of the glass, but not to remain so long as to prevent its easy removal from the glass by reason of its increasing adherence thereto, and the time varies, according to circumstances, from one to thirty hours.

When the marbles are required to be made in such forms as table-tops, panels, or moldings, I place suitable molds upon the surface of the glass and fix them, either by suitable cements, cramps, or pins, and apply the colors and cement to the glass and mold simultaneously, and increase the thickness by adding the cement backing, as before described.

For pilasters, columns, or other circular or irregular objects, I construct suitable molds in various pieces, made to fit each other exactly to the complete form desired, and apply the colors and cements, as before described, to each piece of the mold separately, but taking care to continue the veining of the fibers and colors from one part of the mold to another part, so that the design is continuous from one to the other, so that when the parts of the mold are united, the design or pattern of the marble appears connected as in one piece, like real marbles. The colored cement is then lined over within the mold by a backing of coarser cement, and the object thus made hollow may be then filled up or strengthened with any suitable material, as may be required.

The second part of my invention relates to the manufacture of ornamental objects or designs, either in metal, wood, or glass, ivory, porcelain, or Marezzo marble of varied colors; and I make them with either beveled, slotted, or indented sides, and then embed, inlay, or fix them, by suitable rods and pins, or cement used in the process in other masses of the artificial substance, or colored cement known as Marezzo marble, by inlaying such objects of designs during the process of the manufacture of the Marezzo marble, before the backing used therein is applied, and while the marble is still in its plastic condition and capable of running around and into the beveled, slotted, or indented sides of the objects or designs, and thus securely fixing them in its solid substance. By this means I produce the effect of an inlaid ornamental device, either in buhl, mosaic, or other design, in various substances or colors, embedded in the substance of the marble or so as to have the appearance of marble or other substance, of one pattern inlaid with marble, or other substance of another pattern. The rods and pins previously used to hold them in places may then be removed or left in the backing.

Objects thus formed and ornamented in artificial or Marezzo marble, according to my invention, can be produced with greater rapidity than by any other process of inlaying, and they may be combined with other materials and applied to a variety of purposes, such as the forming and ornamenting of pedestals, pilasters, vases, plinths, fascias, columns, slabs, panels, chimney-pieces, medallions for stoves, for brackets, and for pavement, whereby a highly ornamental mosaic effect may be produced, combined with great durability. They may also be combined with articles of furniture and lettered, and other devices may be formed, as above described, in artificial marble, and applied for name-plates, altar-pieces, and tablets for advertising purposes; also for naming of streets of buildings; also for architectural purposes, such as the ornamentation of the interior or exterior of buildings in the form of medallions, entablatures, panels, compartments, or designs inserted in the walls, window-sills, and for chimney-pieces or doors; also for fountains and monumental purposes. And according to the third part of my invention, I manufacture ornamental bricks by inserting various designs made of suitable heat-resisting substances or materials, embedding them in the clay flush with the surface of the brick while in its plastic condition. I effect this part of my invention by fixing or embedding the ornamentations to be inlaid by suitably-shaped rods, pieces of wire, or pins, before mentioned, in their proper place and position; or sometimes I use suitable cement for the purpose, and then proceed to cover them with the Marezzo marble in its plastic condition, and allow the whole to dry upon the surfaces or molds in which it is manufactured.

When the marbles or embedded designs are removed from the molds or surfaces on which they are formed, they are rubbed down and stopped with cement. Where any holes may occur they may then be stoned and allowed to dry, after which they are ready for polishing or enameling by the usual processes, and may be sawn or cut into various shapes and sizes, and polished in the same manner as ordinary marble.

Having now particularly described the nature of my invention, and the manner in which I carry the same into practice, I would have it understood that I do not confine or restrict myself to the precise details which I have laid down, as variations therein may be made without deviating from the main features of the said invention; but—

What I claim is—

1. The process hereinbefore described for imitating various kinds of marbles or other like substances, and making such imitations in any form.

2. The improvements for manufacturing, ornamenting, and inlaying artificial marble with other marbles or suitable substances, or in combination with other materials.

3. The coloring, ornamenting, and inlaying cement, as hereinbefore described.

GEORGE DAVEY.

Witnesses:
CHARLES BARLOW, *Patent Agent,*
   23 *Southampton Buildings, London.*
JOHN KING,
   44 *Upper Marylebone St., London.*